H. G. POTTER.
PUMP ATTACHMENT FOR AUTOMOBILES.
APPLICATION FILED JAN. 19, 1916.
1,222,027.
Patented Apr. 10, 1917.
2 SHEETS—SHEET 1.
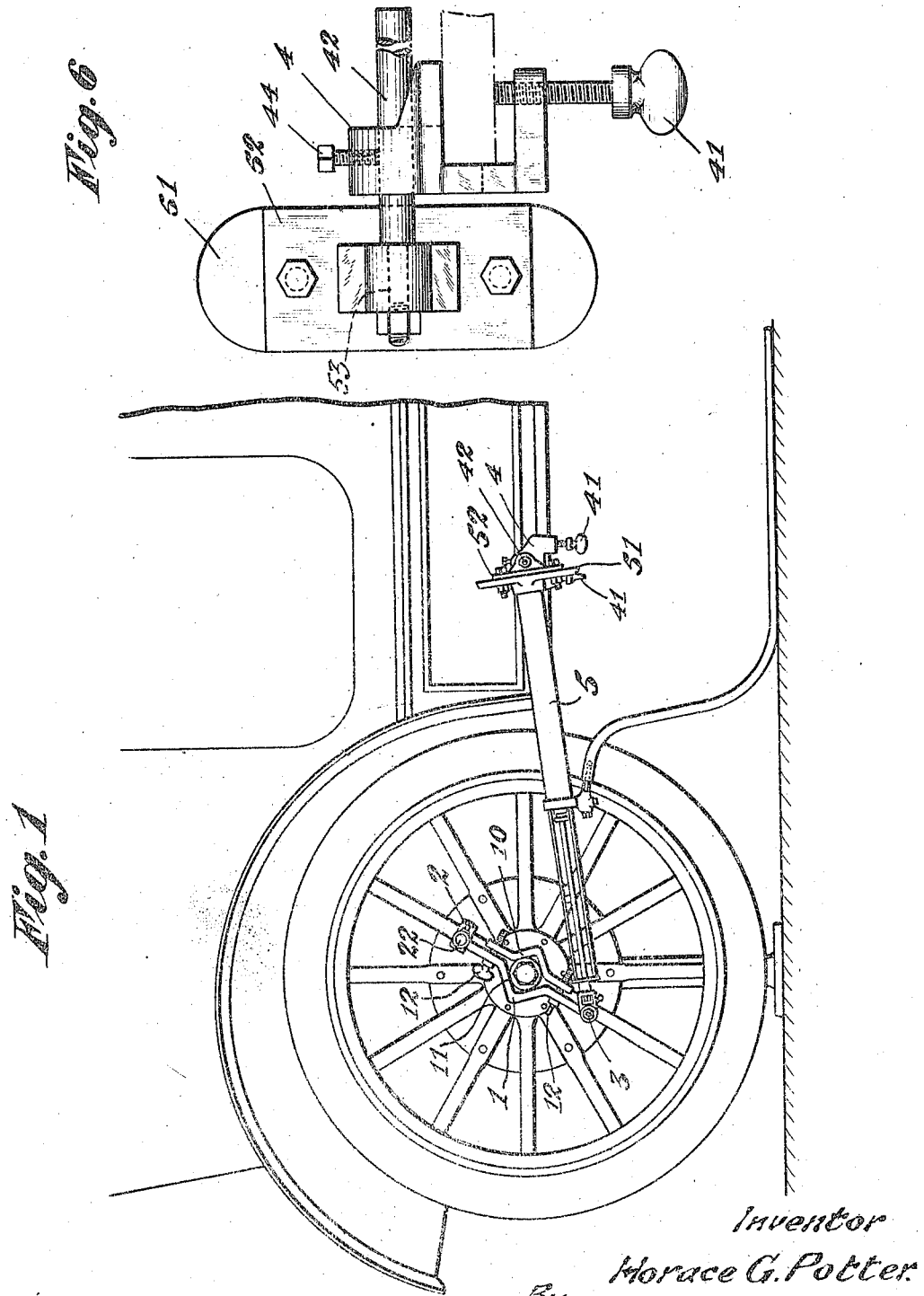
Inventor
Horace G. Potter.
By Reynolds & Sproll
Attorneys.

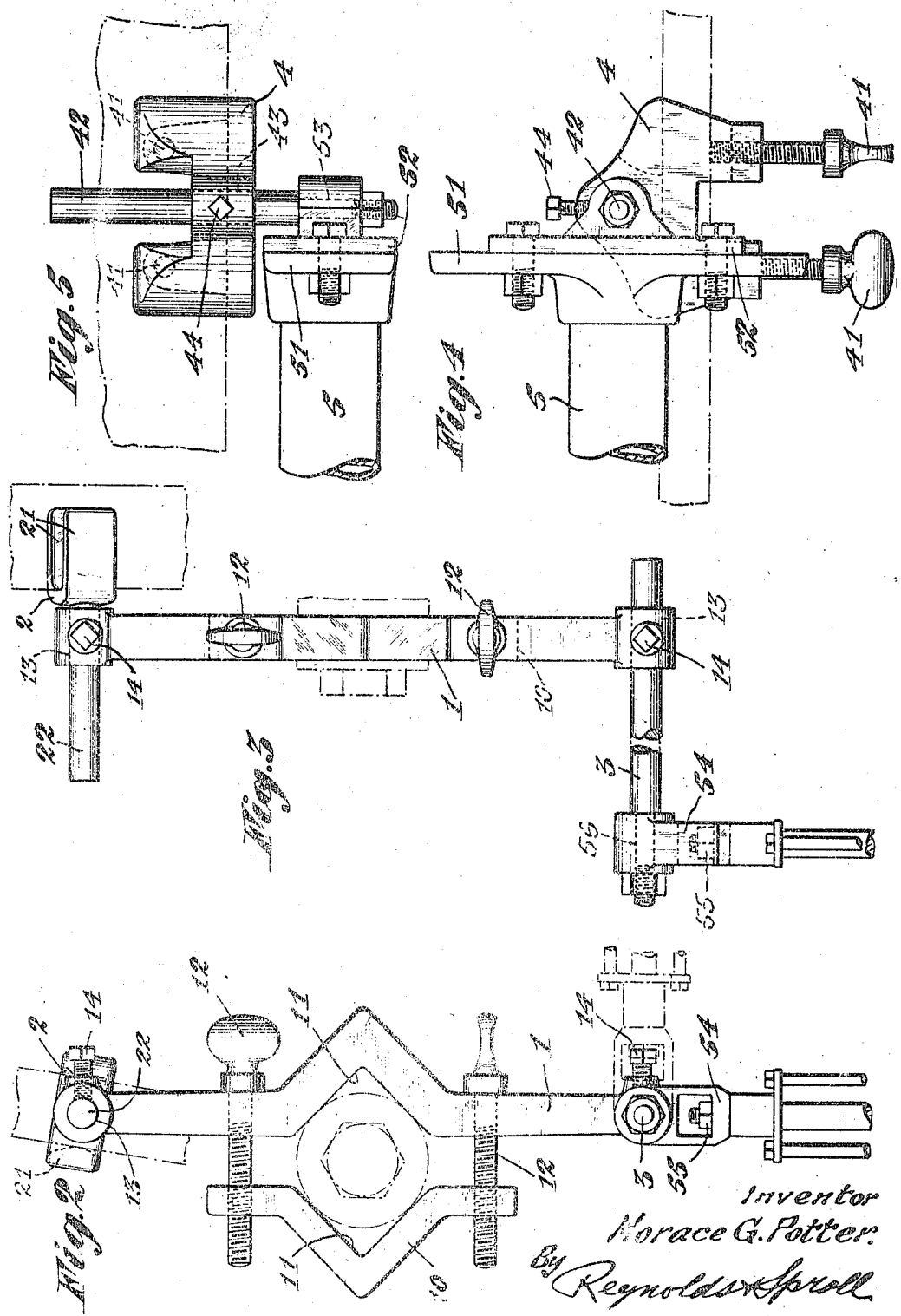

UNITED STATES PATENT OFFICE.

HORACE G. POTTER, OF SEATTLE, WASHINGTON.

PUMP ATTACHMENT FOR AUTOMOBILES.

1,222,027.  Specification of Letters Patent.  Patented Apr. 10, 1917.

Application filed January 19, 1916. Serial No. 73,064.

*To all whom it may concern:*

Be it known that I, HORACE G. POTTER, a citizen of the United States, and resident of the city of Seattle, county of King, State of Washington, have invented certain new and useful Improvements in Pump Attachments for Automobiles, of which the following is a specification.

My invention relates to pumps, and particularly to pumps which are adapted to be operated by the engine of an automobile for pumping up the tires.

The object of my invention is to provide a pump of this character which is of simple construction, which is easy to operate, and which is quickly and easily attached to or detached from the car and which may be operated by the power plant of the car.

My invention consists of the novel parts and combinations of parts which are shown in the drawings, and which will be hereinafter described in the specification and defined by the claims terminating the same.

In the accompanying drawings I have shown my invention in the form which is now preferred by me.

Figure 1 is a side elevation of a portion of an automobile, showing my device in operative position.

Fig. 2 is a side elevation, and Fig. 3 is a plan view of my hub clamp, portions of the automobile wheel being shown in dot and dash lines.

Fig. 4 is a side elevation of my running board clamp, the running board being indicated by dotted lines.

Fig. 5 is a top plan view, and Fig. 6 an end view of the same.

While my invention may be otherwise constructed, I have herein shown it as consisting of attachments which are applicable to an automobile and to an ordinary foot-pump, such as are kept in the tool-kit of a car. These attachments are so placed on the car and on the pump that the pump may be operated by the power plant of the car.

One part of the attachment consists of a crank device which is adapted to be clamped to the rear wheel of a car, to turn therewith. This crank device operates the piston of an ordinary pump. Another part of the attachment is a pivot base which is adapted to be clamped upon the running board. This pivot base secures the foot end of the pump to the running board by a pivotal connection.

In carrying out my invention I employ a clamp which fits upon the hub of a rear driving wheel. This clamp preferably consists of two parts 1 and 10, having recesses at 11 adapted to receive the hub or dustcap of an automobile wheel. Two wing bolts 12, or any suitable equivalent device, secure the members 1 and 10 in place. Member 1 is provided with holes 13, one at each end thereof.

A yoke or fork 2, may be placed with its finger 21 spanning a spoke of the wheel and its stem 22 adjustably secured in one of the holes 13. It is secured in adjusted position by a set screw 14. In this way the whole clamp is positively turned as by a crank arm, and no torsional strain is put upon the hub or dust-cap. There is no possibility of the clamp slipping.

At the other end of member 1, a crank pin 3 is adjustably secured in the second hole 13 by a like set screw 14.

I also provide a clamp 4, which is adapted to fit upon the running board of the automobile, adjacent to the wheel. Clamping screws 41 secure this clamp in place. A pivot axis 42 is adjustably secured in hole 43 in this clamp 4, by means of a set screw 44.

I employ an ordinary foot pump 5, to do the pumping. To the base 51 of this pump I secure a bearing member 52. This bearing member has a bearing 53 which receives the end of pivot axis 42.

The handle is removed from the upper end of the piston rod of the pump, and in its place I secure a second bearing member 54. This member 54 is held in place by a nut 55, and has a bearing 56 which receives the end of crank pin 3.

When the two clamps and the pump are properly secured in place upon a wheel, this one rear wheel is jacked up. The engine is started, and the free wheel only turns. Its speed may be varied to suit conditions. The crank pin 3 turns with the wheel, and the pump itself being held, the piston rod is reciprocated.

It will be noticed that pivot axis 42, crank pin 3, and stem 22 are all adjustable in and out. In this way the device may be adjusted to fit any type of car. The clamp members 1 and 10 will fit upon any hub or dust-cap, and clamp 4 will fit upon any running board. The device may, therefore, be applied to any make of automobile. The driver by its use, may quickly and with very little labor pump up a flat tire. The bulk of the device is slight and it may be carried in the tool-kit.

What I claim as my invention is:

1. A power pump attachment for automobiles, comprising a member provided with means for securing it upon the foot board of the automobile and a pivot pin mounted for axial adjustment thereon and extending horizontally outward from the car, a frame provided with means for securing it to a wheel of the car, a crank pin mounted for axial adjustment thereon, and two pivot blocks provided, one with means for securing it upon a pump base and the other with means for securing it to a pump piston rod, and means for securing each block in fixed position upon its pivot pin.

2. A power pump attachment for automobiles comprising a base provided with means for clamping it upon the foot board of a car and having a pin-receiving socket positioned to hold a pin in horizontal position extending transversely of the car, a pivot pin fitting said socket, means for securing the pin in axial adjustment in said sockets, a frame provided with means for securing it upon a car wheel and a pin-receiving socket, a crank pin and means for holding it in axially adjusted position in said socket, two bearing members, one secured upon the outer end of said crank pin and the other upon the pivot pin, and means for securing one of said bearing members to a pump cylinder and the other to the pump piston rod.

Signed at Seattle, Washington, this 12th day of January 1916.

HORACE G. POTTER.